W. E. Sibley,
Machine Gearing.
N° 53,236. Patented Mar 13, 1866.

Witnesses;
James M Fowler
C H Blanchard

Inventor;
Willard E. Sibley
By his Atty, S. Dennis Jr

UNITED STATES PATENT OFFICE.

WILLARD E. SIBLEY, OF WESTON, MASSACHUSETTS, ASSIGNOR TO NATHANIEL L. SIBLEY.

IMPROVEMENT IN GEARING FOR GRINDING OR OTHER ROLLERS.

Specification forming part of Letters Patent No. 53,236, dated March 13, 1866.

*To all whom it may concern:*

Be it known that I, WILLARD E. SIBLEY, of Weston, Middlesex county, State of Massachusetts, have invented certain new and useful Improvements in Gearing for Connecting Feeding, Grinding, Crushing, and other Rollers; and I do hereby declare the following description and accompanying drawings are sufficient to enable any person skilled in the art or science to which it most nearly appertains to make and use my said invention or improvements without further invention or experiment.

The nature of my invention and improvements consists in gearing or connecting the pinions of two feeding or other rollers by means of an independent gear-wheel with external and internal teeth arranged to mesh properly with the teeth of the pinions, whether the rollers are worked near together or far apart, and in linking the shafts of the pinions and the pivot of the external and internal gears together, so that the pinions will always work the same distance from their respective gears; and in the arrangement of a plate to protect the internal gear and its pinion.

Figure 1:
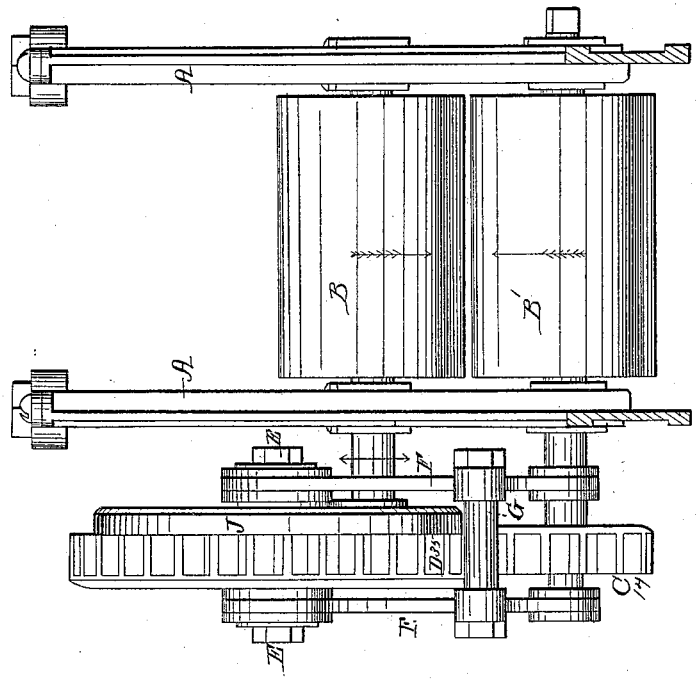
Figure 2:
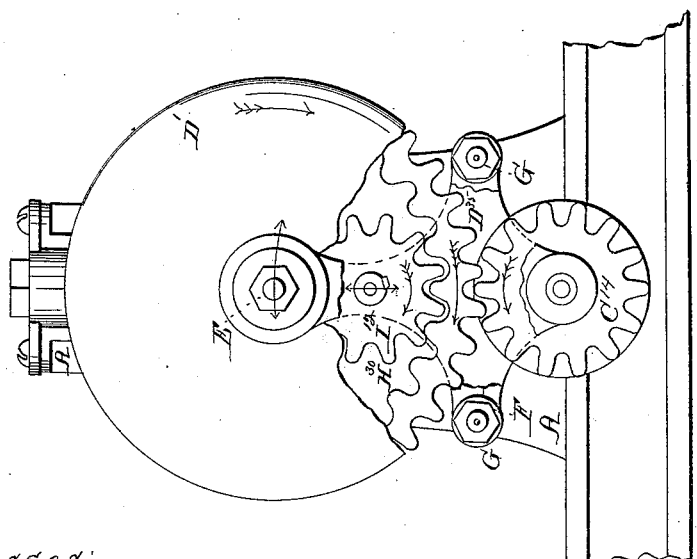

In the accompanying drawings, Figure 1 is an elevation of a pair of rollers arranged in a pair of plumber-blocks and connected by my improved gearing. Fig. 2 is an end elevation of the same with a part of the plate of the gear and connecting-link broken away to show the meshing of the gearing.

A A are two plumber-blocks provided with journal-boxes for the shafts of the rollers B B'. The boxes for the roller B are arranged to move up and down in the plumber-blocks to accommodate the space between the rollers to materials of varying or different thickness, and the roller B may be pressed down by springs, weights, or other devices arranged to act on the journal-boxes. The pinion C, with fourteen teeth, is fastened to the shaft of the roller B', and drives the external gear, D, with thirty-five teeth, which turns on the stud or pivot E, which is connected by the links F F to the shaft of roller B, to always hold the shaft and pivot the same distance apart and keep the gears properly in mesh, the links vibrating freely on the shaft of the roller B'.

The links F F are firmly connected together by the rods G G, as shown in the drawings.

The gear D is a rim on the side of the disk D', and the internal gear, H, of thirty teeth, is on the inside of this rim, as shown in Fig. 2, and it drives the pinion I, of twelve teeth, fastened on the shaft of the roller B to turn it the same speed that the roller B' turns, but in the opposite direction, so that the surfaces of the rollers which are next to each other will move in the same direction with equal velocity to feed, roll, or crush the material passing between them.

The stationary plate J covers the internal gear, H, and pinion I, and it is perforated for the pivot E and shaft of the roller B, the latter turning freely in it, and it serves as a link to hold the pivot E and shaft of the roller always the same distance apart to keep the teeth of the gear H and pinion I constantly and properly in mesh when the rollers are working near together or far apart. The rollers and gears all turn in the direction indicated by the arrows upon them, and when the rollers work close together the pivot E is nearly or quite in a line with the centers of the roller-shafts; but when the roller B rises the pivot E, with its gears D and H, swings off to the right, as indicated by the double-headed arrow across it, so that the center E is always the same distance from the centers of the shafts B and B', so that the teeth of all the gearing is properly and uniformly in mesh. The link F behind the plate J is bent or curved, so as not to interfere with the shaft of the roller B. I contemplate that one of the links F may be used instead of two, and that the lower end of the inside link, F, may be fitted to vibrate on an extension of the journal-box of the shaft of the roller B' to relieve the shaft from the friction of the link; also, that the plate J may be dispensed with and the pivot E simply linked to the shaft of the roller B, and, further, that this improved gearing may be applied to both ends of the roller-shafts.

This gearing is peculiarly adapted for the feed-rollers of planing-machines, and may be used on squeezers, clothes-wringers, and mills for rolling iron, grinding sugar-cane, and by varying the proportions of the pinions and gears the surface of one roller may be made to move faster than the other for grinding or crushing.

What I claim as my invention and improvement is—

1. Connecting the shaft of the rollers B and B' by the pinions C and I and the external gear, D, and internal gear, H, substantially as described.

2. Linking the shafts of the rollers or pinions and the pivot of the external and internal gears together, substantially as described, so that the pinions and gear will always mesh properly, whether the rollers are worked near together or far apart.

3. The plate J, in combination with the pinion and gear, substantially as described, for the purpose set forth.

WILLARD E. SIBLEY.

Witnesses:
J. W. WHITNEY,
OEL FARNSWORTH.